Figure 1:
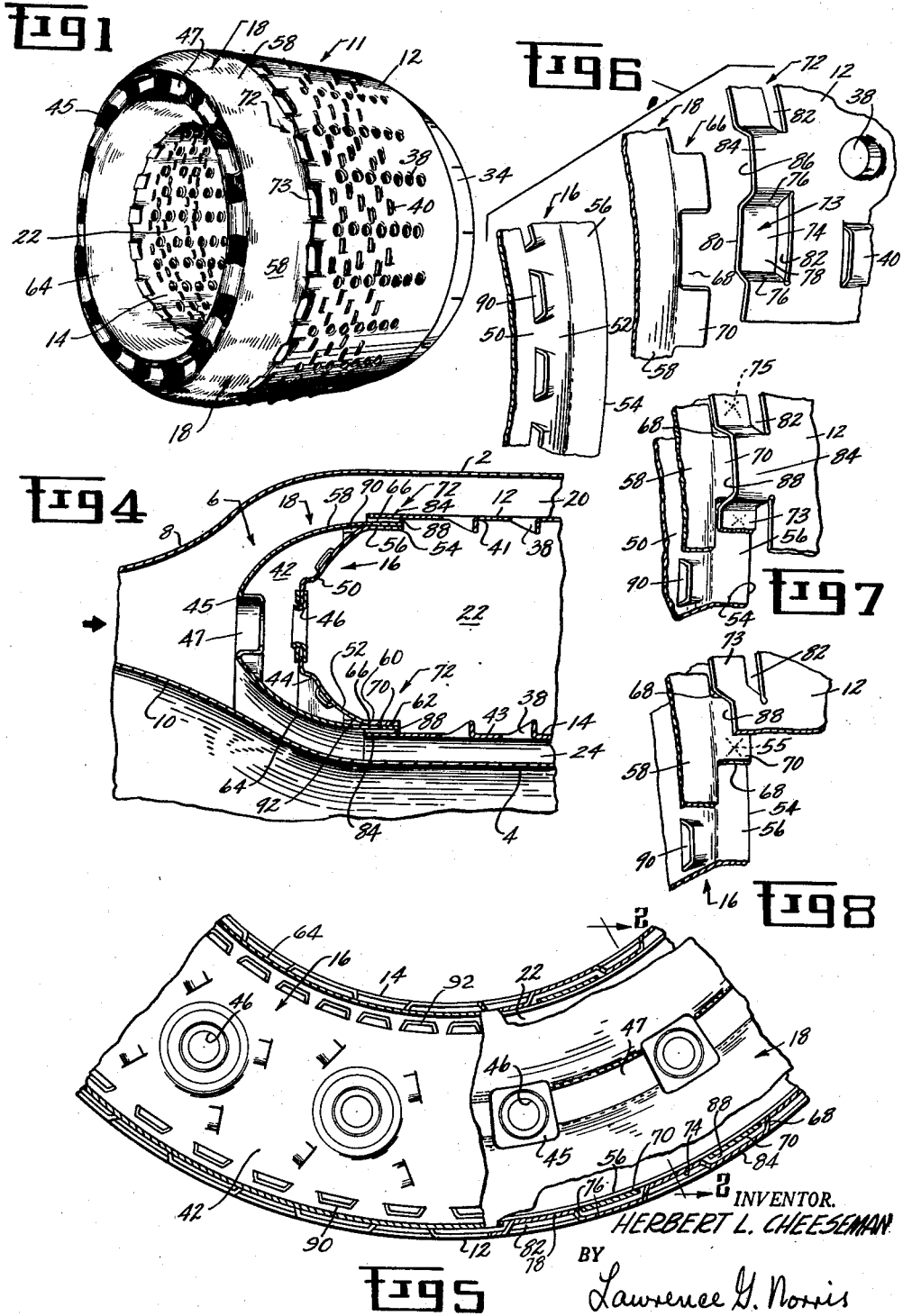

April 26, 1960 — H. L. CHEESEMAN — 2,933,895
COMBUSTION CHAMBER
Filed Dec. 31, 1957 — 2 Sheets-Sheet 1

INVENTOR.
HERBERT L. CHEESEMAN
BY Lawrence G. Norris
ATTORNEY

April 26, 1960

H. L. CHEESEMAN 2,933,895

COMBUSTION CHAMBER

Filed Dec. 31, 1957

2 Sheets-Sheet 2

INVENTOR.
HERBERT L. CHEESEMAN
BY
Lawrence G. Norris
ATTORNEYly outwardly from the shaft 7 which connects the tur-
United States Patent Office

2,933,895
Patented Apr. 26, 1960

2,933,895

COMBUSTION CHAMBER

Herbert Larcombe Cheeseman, Wenham, Mass., assignor to General Electric Company, a corporation of New York Application December 31, 1957, Serial No. 706,527

8 Claims. (Cl. 60—39.69)

This invention relates to a novel combination joint-louver construction for joining together three thicknesses of material which are subject to intense heat so as to permit efficient cooling of the material at and adjacent the joint to thereby eliminate buckling due to thermal distortion. More particularly, it relates to such a joint for joining together parts of a thermal reactor, especially a combustor of the type used in turbo-jet engines.

In the design of small, annular combustors used in small turbo-jet engines, especially of the type described in co-pending application Serial No. 548,987 filed by Gerald William Lawson, November 25, 1955, a source of buckling due to thermal distortion has been the joint connecting the annular combustor shell which defines a wall of the combustion space, the end dome, which forms an end wall of the combustion space, and the cooling cowl or shroud, which forms a dome cooling space over the end dome. This has been due to the fact that overlapping and abutting portions of all three parts were welded together to form a welded joint of three stock thicknesses. This made effective cooling difficult not only because of the three stock thickness of the joint but also because of the difficulty in introducing cooling fluid at and adjacent to such a joint, especially along the internal surface of the shell immediately downstream of the joint.

An object of the present invention is to eliminate the above-mentioned disadvantages by providing a novel joint construction for joining together three thicknesses of material, especially a shell, end dome and cowl of a thermal reactor, in which joint construction the maximum number of stock thicknesses fabricated together is two, and which joint construction incorporates a novel louver arrangement for directing a continuous film of cooling fluid over the surfaces of the joint and the parts adjacent thereto, including the internal surface of the shell immediately downstream of the joint. Another object of the present invention is to provide such a joint construction in which the film of cooling fluid is uniform in thickness to thereby provide uniform cooling of the joint and the adjacent parts. Another object is to provide such a joint which is simple and inexpensive to manufacture, does not require additional parts and does not add to the overall weight of the thermal reactor. In fact, the weight is reduced. Another object is to provide an improved joint construction for joining together three thicknesses of material which are subject to intense heat.

Briefly stated and in accordance with one aspect of the invention, such a joint construction is obtained by providing one of the thicknesses, for example the cowl, with a plurality of spaced portions or fingers which overlap and are fabricated to a portion of the second thickness, for example the dome, and by providing the third thickness with a portion which overlaps the above-mentioned portion of the second thickness and such fingers and which has a plurality of spacer members extending between adjacent fingers of the first thickness and fabricated to the overlapped portion of the second thickness. The spacer members space the third thickness from the second thickness and the overlapping fingers of the first thickness to provide a series of spaced louver openings between the fingers and the overlapping portion of the third thickness. These louver openings direct streams of cooling fluid along the fingers and thence along the internal surface of the third thickness, or shell, downstream of such openings. The spacer members also provide a second series of louver openings located between the first series and separated therefrom by relatively thin walls for directing streams of cooling fluid along the internal surface of the third thickness, or shell, downstream of such openings. Preferably, the spacer members comprise offset areas formed in the overlapping portion of the third thickness, or shell, the second series of openings being formed by slits or separations in the shell, where the offset areas are offset from the rest of the shell. By making the height of the first series of openings substantially the same as the height of the second series of openings, the streams or films of air flowing therethrough and along the internal surface of the third thickness are substantially uniform. Consequently, uniform cooling is obtained.

Figure 2:
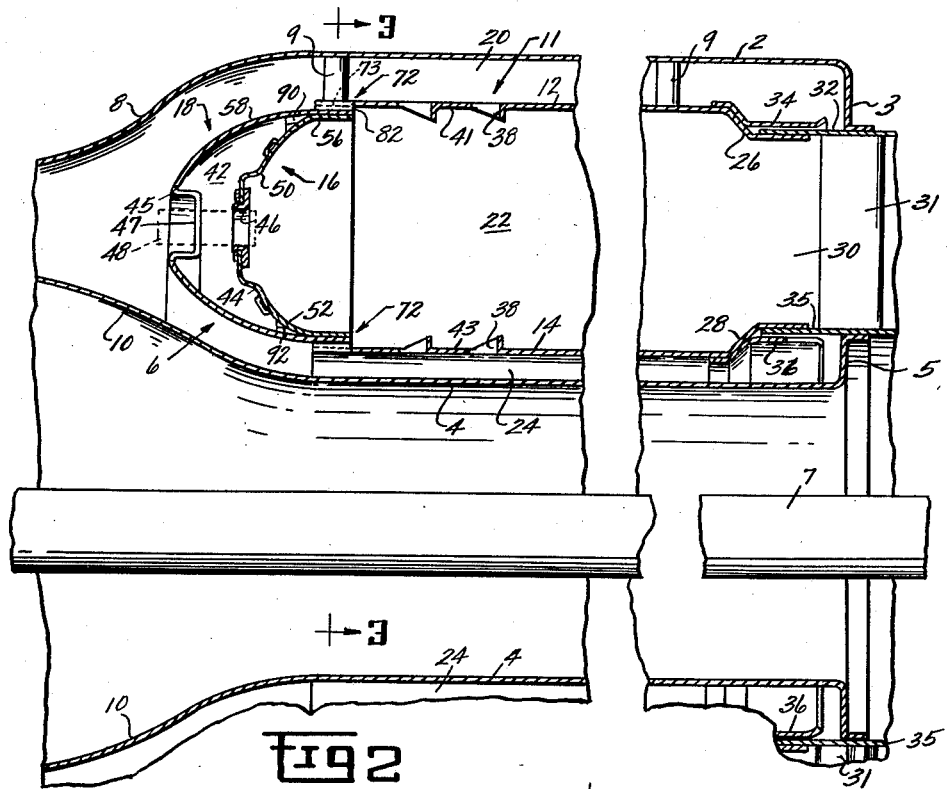
Figure 3:
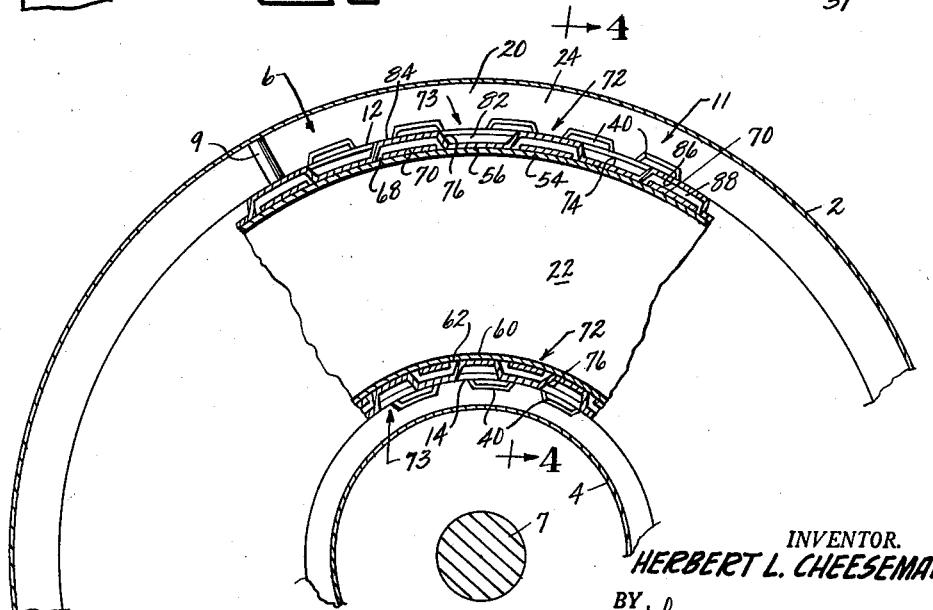

The above-mentioned objects and explanation of the invention, as well as other objects of the invention, will become more apparent when read in the light of the following description and claims taken in conjunction with the accompanying drawings, in which the parts are designated specifically but are intended to be regarded as generically as the prior art will permit, and in which:

Fig. 1 is a view in perspective of a combustor embodying the present invention; Fig. 2 is a section in elevation of the combustor section of a turbo-propeller engine of the type described in application Serial No. 548,987 with the combustor of Fig. 1 installed therein; Fig. 3 is a portion of a section taken along the line 3—3 of Fig. 2; Fig. 4 is a section taken along the line 4—4 of Fig. 3; Fig. 5 is an end view of a part of the combustor of Fig. 1 with a part of the cowl cut away to show the front of the dome and with a part of the dome cut away to show a section of the joint between the cowl, dome and shells of the combustor, Fig. 6 is an enlarged exploded view of parts of the combustor shell, dome and cowl forming the joint; Fig. 7 is a view corresponding to Fig. 6 but with the parts shown in the position they occupy when they are joined together; Fig. 8 is a view corresponding to Fig. 7 with a part of the shell cut away to show the joint between the dome and cowl.

Referring to the figures, 2 is the outer cylindrical casing or housing of the engine. 4 is a cylindrical inner casing, which forms with a casing 2 an annular plenum chamber 6 and which extends around and is spaced radially outwardly from the shaft 7 which connects the turbine wheel (not shown) aft of the combustor section with the compressor (not shown) forward of the combustor section.

The forward end portion of casing 2 converges at 8 and the forward end portion of inner casing 4 diverges at 10. The ends 8 and 10 form an annular opening into which compressed air flows from the engine compressor forward of the combustor section. The aft end of casing 2 is provided with a radially inwardly extending flange 3 which extends to the outer nozzle diaphragm 32. The aft end of casing 4 is provided with a radially outwardly extending flange 5 which extends to the inner nozzle diaphragm 35. The two end flanges 3 and 5 form an end closure for the plenum chamber 6. The inner casing is attached to the outer casing by means of streamlined struts (not shown) forward of the burner section.

Mounted within the plenum chamber 6 and to casing 2 by means of a plurality of streamlined, circumferentially spaced mounting lugs 9 is an annular combustor assembly 11 made up of a cylindrical, sheet metal, outer shell 12, a cylindrical, sheet metal, inner shell 14, an annular end dome 16 and an annular cooling cowl or shroud 18. The thicknesses of the two shells, dome and cowl are substantially the same.

Outer shell 12 is concentric with cylindrical casing 2 and spaced radially inwardly therefrom to form therewith an outer annular plenum chamber 20.

Inner shell 14 is concentric with shell 12 and is spaced radially inwardly therefrom to form therewith an annular combustion or thermal reaction space 22. Inner shell 14 is also concentric with and spaced radially outwardly from the cylindrical inner casing 4 to form therewith an inner annular plenum chamber 24.

The aft end portion of shell 12 converges radially inwardly at 26, as shown in Fig. 2, and the aft end portion of shell 14 diverges radially outwardly at 28 as shown in Fig. 2, portions 26 and 28 forming an annular outlet 30, which directs hot combustion gases from combustion chamber 22 to the nozzle partitions 31 of the gas turbine. The forward edge of the cylindrical outer nozzle diaphragm 32 is clamped in a gas tight manner, as shown, between portion 26 and a resilient cylindrical member 34 attached to the shell 12. The forward edge of the cylindrical inner nozzle diaphragm 35 is clamped in a gas tight manner, as shown, between shell portion 28 and a resilient cylindrical member 36 attached thereto.

Cylindrical shells 12 and 14 have a plurality of apertures 38 and louvers 40 punched therein (see Fig. 1), which direct compressed air from plenum chambers 20 and 24 into the combustion or thermal reaction space 22. Louvers 40 are designed to direct the air along the internal surfaces 41 and 43 of the outer and inner shells respectively to provide a moving air film thereover which protects the shells against the intense heat generated by the thermal reactions in the combustion space 22. Apertures 38 on the other hand are designed to direct the air into the space 22 in a direction transverse to the longitudinal centerline thereof.

Annular end dome 16 is made of sheet metal and extends over the forward end of annular combustion space 22 to form an end wall of the combustion space, as shown. It has a plurality of apertures 46 spaced along the top thereof for receiving a plurality of fuel nozzles 48.

Cowl 18 comprises an annular, dome-shaped member made of sheet metal and extending forwardly over the dome 16, as shown, to form therewith an annular dome cooling chamber 42 for cooling the outer surface 44 of dome 16. The top of dome-shaped cowl 18 has an annular groove 47 therein and a plurality of spaced, square holes 45 passing therethrough, such holes being axially aligned with holes 46, as shown. Fuel nozzles 48 (see Fig. 2) extend through holes 45 but the holes are substantially greater in cross-sectional dimension than nozzles 48 so that a passage is provided between the periphery of each nozzle and the edge of its hole 45, through which passage compressed air passes from plenum chamber 6 into the dome cooling chamber 42.

Referring to Fig. 4, done 16 extends aft into an annular, radially outer leg 50 and an annular radially inner leg 52. Outer leg 50 terminates in a cylindrical portion 54 to the outer surface 56 of which the forward end of cylindrical shell 12 and the aft end of outer leg 58 of dome-shaped cowl 18 are joined in a manner to be described hereinafter. Inner leg 52 of the dome extends aft into a cylindrical portion 60 to the outer surface 62 of which the forward end portion of inner cylindrical shell 14 and the aft end portion of leg 64 of cowl 18 are fabricated in the same manner that shell 12 and leg 58 of cowl 18 are fabricated to leg 50 of the dome.

Outer leg 59 of cowl 18 extends aft into a cylindrical edge portion 66, as shown in Figs. 3, 4, 5 and 6 to 8, which overlaps cylindrical portion 54 of dome 16 and which has a plurality of circumferentially spaced notches or openings 68 therein defining a plurality of circumferentially spaced portions or fingers 70 fabricated, as by spot welding at 55, to the outer cylindrical surface 56 of cylindrical portion 54 of leg 50. Although in the drawings notches 68 are in the edge of overlapping portion 66, they may be spaced from such edge in which case they are more in the nature of apertures. The term "notch" as used herein is intended to include both arrangements, the term "fingers" being intended to refer to the strips of material between the spaced notches whether they are in the edge or spaced from the edge.

Shell 12 is spaced radially outwardly from surface 56 and has an upstream edge portion 72 which overlaps surface 56 and fingers 70. The shell is fabricated to dome 16 by means of a plurality of circumferentially spaced, offset areas or depressions 73 which extend radially inwardly through notches 68 and are fabricated as by spot welding at 75 (see Figs. 7 and 2) to surface 56. Each offset area 73 defines a channel 74 extending in an axial direction and having side walls 76 and a floor 78 which is the part that is welded to surface 56. Each channel 74 is open at its axial ends, the opening at the upstream end being defined by the offset edge 80 of the outer shell 12 and the opening at the downstream end being defined by a circumferentially extending slit or opening 82 in shell 12 where the downstream edge of the offset area 73, forming the corresponding downstream end of the channel, is offset from the shell proper, as shown in Figs. 6 to 8. Channels 74 form a series of circumferentially spaced louvers defining a series of circumferentially spaced louver openings 82. Compressed air flows from plenum chamber 20 through channels 74 along the floors 78 and walls 76 thereof, through louver openings 82 and is directed in the form of a series of protecting films or streams along the internal surface 41 of outer shell 12 downstream of openings 82.

Offset areas 73 not only form the series of louvers referred to above and provide means for fabricating the shell 12 to the cylindrical surface 56 of the dome, but they also function as spacer members for spacing shell 12, including the overlapping parts 84 thereof located between adjacent offset portions 73, radially outwardly from surface 56 to provide exposed areas on such surface to which fingers 70 can be fabricated and to provide spaces 86, defined by such exposed areas, overlapping parts 84 and adjacent walls 76 of adjacent offset portions 73, for receiving the fingers 70. The radial depth of each space 86 is substantially greater than the radial thickness of the finger 70 received in it, to thereby provide a louver opening or space 88 defined by an overlapping part 84, a finger 70 and adjacent walls 76 of adjacent offset areas 73. Thus, another function of offset portions 73 is to provide another series of circumferentially spaced louver openings 88 through which streams of compressed air in the form of films or layers are directed from plenum chamber 20 along fingers 70 and walls 76 and thence along the internal surface 41 of outer shell 12 downstream of such louver openings.

The series of louvers 74, 82 are separated from the series of louvers 88 only by the thickness of wall 76 which is equal to the thickness of the sheet metal stock of the shell 12. This thickness is so small that the films or streams of compressed air directed by both series of louvers along the internal surface 41 of shell 12 downstream thereof form a continuous film covering the surface. Consequently, the overlapping portion 72 of the shell 12 provides a 360° louver around the joint. Since both series of louver openings are defined by an edge of the shell 12 the internal surface 41 immediately adjacent to the joint is effectively cooled.

The outer surface of the shell 12 is cooled by air moving through the plenum chamber 20.

The air moving through spaces 74 and openings 82 provide a cooling air film over the floors 78 and walls 76 while air moving through spaces 88 provides a moving layer of cooling air over fingers 70 and the other sides of walls 76.

The radial depth of openings 88 and 82 are substantially the same because the radial thicknesses of the floors 78 and fingers 70 welded to surface 56 are substantially the same. Consequently, the air films passing through the louver openings 88 and 82 and moving along the internal surface 41 of shell 12 are uniform to provide uniform cooling.

Leg 50 of dome 16 has a plurality of louvers 90 spaced circumferentially therearound to direct streams of cooling air in the form of films from chamber 42 therethrough and along the inner surface of cylindrical portion 54 of the dome 16 opposite surface 56 to which the fingers 70 and floors 78 are fabricated.

The joint joining inner shell 14 and inner leg 64 of cowl 18 to inner leg 52 of the dome is similar to the above-described joint joining the outer shell 12 and outer leg 58 of cowl 18 with the outer leg 50 of the dome except that the cylindrical portion 60 of inner leg 52 and the surface 62 thereof, to which the inner shell 14 and fingers 70 of inner leg 64 of cowl 18 are fabricated, are located radially outwardly of the overlapping fingers and of the overlapping portion 72 of inner shell 14. Consequently the offset portions 73 of such overlapping portion extend radially outwardly through the notches 68 and between the fingers 70 of the overlapping portion 66 of the inner leg 64 of the cowl, and the louver openings direct a moving film of air of substantially uniform thickness over the radially outer surface 43 (forming the inner surface of the annular combustion space 22 and therefore referred to hereinafter as an internal surface) of inner shell 14. The air moving through inner plenum chamber 24 provides a moving film of air over the radially inner surface of the shell (hereinafter called an external surface because it is external of the thermal reaction chamber 22). Since the radially outer and radially inner joints are of like construction, like numerals have been applied to like parts.

Inner leg 52 of dome 16 is provided with a plurality of louvers 92 spaced circumferentially therearound for directing a flow of air over the radially outer surface of cylindrical portion 60 of dome 16 opposite from the surface 62 to which the floors 78 and fingers 70 are welded.

Although each of the joint constructions described above joins three parts of the combustor together, the maximum number of stock thicknesses joined together is two. At the same time, a 360° louver is provided which effectively cools the joint and parts adjacent thereto, including the internal surface of the shell immediately downstream of the joint.

The joint constructions of the present invention are easily and inexpensively manufactured and do not require any additional parts. It is only necessary to form offset portions in the edges of the shells and to notch the downstream edges of the cowl. The weight of the combustor is not increased. In fact, it is slightly reduced because of the notches in the cowl.

While one particular embodiment of the invention has been illustrated and described, it will be obvious to those skilled in the art that various changes and modifications may be made without departing from the invention. It is intended to cover in the appended claims all such changes and modifications that come within the true spirit and scope of the invention.

What I claim as new and desire to secure by Letters Patent of the United States:

1. A joint construction comprising a cylindrical shell defining a wall of a thermal reaction space, an end dome forming an end wall of said reaction space, a cooling cowl extending over an end of said dome and forming with said dome a dome cooling chamber, said cowl having a plurality of spaced fingers which overlap and are joined to a portion of said dome, said shell having a portion overlapping said portion of said dome and said fingers, a plurality of spacer members extending from said portion of said shell between adjacent ones of said fingers and joined to said portion of said dome, said spacer members spacing said shell from said dome a distance substantially greater than the thickness of said fingers to provide a first series of spaced louver openings between said fingers and said portion of said shell, said louver openings directing streams of cooling fluid from outside said reaction space, through said louver openings and into said reaction space.

2. A joint construction according to claim 1, in which said spacer members form a second series of spaced louver openings located between adjacent louver openings of said first series.

3. A joint construction comprising a cylindrical shell defining a wall of a thermal reaction space, an annular end dome forming an end wall of said reaction space, an annular cooling cowl extending over an end of said dome and forming with said dome a dome cooling chamber, said cowl having a plurality of circumferentially spaced fingers which overlap and are joined to a portion of said dome, said shell having a portion overlapping said portion of said dome and said fingers, said portion of said shell formed with a plurality of offset spacer members extending between adjacent ones of said fingers, said offset spacer members forming channels extending in the direction of the longitudinal axis of said shell and including side walls and a floor, said floor joined to said portion of said dome, said offset spacer members spacing said shell from said dome a distance substantially greater than the thickness of said fingers to provide a first series of spaced louver openings between said fingers and said portion of said shell, said channels comprising a second series of spaced louver openings located between adjacent louver openings of said first series and separated therefrom by said side walls, said louver openings directing streams of cooling fluid from outside said reaction space, through said louver openings and into said reaction space.

4. A joint construction according to claim 1, said dome being provided with a plurality of circumferentially spaced louvers for providing communication between said dome cooling chamber and said thermal reaction space, said last mentioned louvers directing a flow of the cooling fluid from said dome cooling chamber along the surface of said overlapped cylindrical portion of said dome opposite to the surface to which said shell and cowl are fabricated.

5. A joint construction for joining three thicknesses of material together comprising a portion of one of said thicknesses overlapping and joined to a portion of the second of said thicknesses, a plurality of spaced notches in said portion of said first thickness, said third thickness having a portion overlapping said overlapping portions of said first and second thicknesses, a plurality of spaced, offset areas formed in said overlapping portion of said third thickness, extending through said notches and joined to said portion of said second thickness, said third thickness being spaced from said second and third thicknesses by said offset areas to provide a series of spaced louver openings between said overlapping portion of said first thickness and said overlapping portion of said third thickness for directing a plurality of streams of cooling fluid therethrough.

6. A joint construction according to claim 5, each of said offset areas forming a channel having a floor and side walls, each of said channels being open at both ends, one open end of said channel being formed by an opening through said third thickness providing communication between the interior of the channel, located at one side of said third thickness, and the other side of said third thickness to thereby form a second series of louver openings for directing cooling fluid through said channels, along said floors, through said openings in said third thickness and thence along said other side of said third thickness.

7. A thermal reactor comprising a cylindrical shell defining a wall of a thermal reaction space, an end dome forming an end wall of said reaction space, a cooling cowl extending over said dome to form a dome-cooling chamber with said dome, said cowl having a cylindrical portion having a series of circumferentially spaced fingers overlapping and joined to a cylindrical portion of said dome, said shell having a portion overlapping said portion of said dome and said fingers, said overlapping portion of said shell having a series of circumferentially spaced offset areas formed therein, said offset areas extending radially toward said cylindrical portion of said dome between said fingers and being joined to said cylindrical portion of said dome, each of said offset areas defining an axially extending channel in the external surface of said shell, said channel having a floor and opposite, circumferentially spaced side walls extending in an axial direction, said channel being open at both of its ends to form a louver opening for directing a flow of cooling fluid through said channel and thence along the internal surface of said shell, the parts of said overlapping shell portion between adjacent channels forming with said side walls and said overlapped dome portion a plurality of circumferentially spaced spaces in which said fingers are received, the radial depth of said spaces being substantially greater than the radial thickness of said fingers, whereby said parts of said shell portions are spaced radially from said fingers to form with said fingers and with the side walls of adjacent channels a second series of louver openings for directing cooling fluid over said fingers and thence along the internal surface of said shell downstream of said second series of louvers.

8. A thermal reactor comprising a casing defining a cylindrical plenum chamber into which a cooling fluid is adapted to flow, a thermal reactor located within said chamber, said thermal reactor comprising a cylindrical shell, an end dome and a cooling cowl, said shell being concentric with and radially spaced from the wall of said plenum chamber and defining a wall of a thermal reaction space, said end dome forming an end wall of said reaction space, said cooling cowl extending over said dome to form therewith a dome cooling chamber for cooling said dome, said cowl having an opening through which cooling fluid is adapted to flow from said plenum chamber into said dome cooling chamber, said cowl having a downstream cylindrical end portion overlapping, and joined to, a downstream cylindrical end portion of said dome, said end portion of said cowl having a series of circumferentially spaced notches therein, said shell having an upstream end portion overlapping said end portions of said dome and cowl, said end portion of said shell having a plurality of circumferentially spaced, offset areas formed therein, said offset areas extending radially through said notches and being joined to said cylindrical portion of said dome, said shell being radially spaced from said end portion of said dome by said offset areas, each of said offset areas forming a channel in the external surface of said shell, said channel having a floor and side walls and extending from the upstream edge of said shell in a downstream direction and being open at its axial ends, the opening at the downstream end being formed by an opening through said shell where the downstream edge of the offset portion defining said channel is offset from the shell proper, said opening comprising a louver opening for directing a flow of cooling fluid from said plenum chamber through said channel and said opening into the reaction space and along the internal surface of said shell downstream of said opening, said floor of said channel being joined to said cylindrical end portion of said dome, the parts of said end portion of said shell located between said channels forming with said side walls and said cylindrical end portion of said dome, spaces into which said end portion of said cowl extends, said parts of said shell being spaced radially from said end portion of said cowl to provide spaces therebetween defining louver openings for directing streams of cooling fluid from the plenum chamber therethrough into said reaction space and along the internal surface of said shell downstream of said last mentioned louver openings.

References Cited in the file of this patent

UNITED STATES PATENTS 547,356    Pancoast _____ Oct. 1, 1895